US012684342B2

(12) United States Patent  
Hu et al.

(10) Patent No.: US 12,684,342 B2  
(45) Date of Patent: Jul. 14, 2026

(54) SECURITY POLICY PROCESSING METHOD AND COMMUNICATION DEVICE

(71) Applicant: HUAWEI TECHNOLOGIES CO., LTD., Shenzhen (CN)

(72) Inventors: Li Hu, Shanghai (CN); Rong Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 345 days.

(21) Appl. No.: 18/348,946

(22) Filed: Jul. 7, 2023

(65) Prior Publication Data

US 2023/0362632 A1  Nov. 9, 2023

Related U.S. Application Data

(63) Continuation of application No. PCT/CN2022/070792, filed on Jan. 7, 2022.

(30) Foreign Application Priority Data

Jan. 10, 2021  (CN) .......................... 202110027552.1

(51) Int. Cl.

| | |
|---|---|
| *H04L 29/06* | (2006.01) |
| *H04W 12/033* | (2021.01) |
| *H04W 36/00* | (2009.01) |

(52) U.S. Cl.

CPC ...... *H04W 12/033* (2021.01); *H04W 36/0011* (2013.01)

(58) Field of Classification Search

None  
See application file for complete search history.

(56) References Cited

U.S. PATENT DOCUMENTS

| | | | | |
|---|---|---|---|---|
| 10,462,837 B2 * | 10/2019 | Escott | ................. | H04W 12/106 |
| 10,681,072 B2 * | 6/2020 | Alfano | ................ | H04L 43/0876 |

(Continued)

FOREIGN PATENT DOCUMENTS

| | | |
|---|---|---|
| CN | 101953193 A | 1/2011 |
| CN | 109362108 A | 2/2019 |

(Continued)

OTHER PUBLICATIONS

Geng, Rong et al. A Software Defined Networking-Oriented Security Scheme for Vehicle Networks. IEEE Access, vol. 6. https://ieeexplore.ieee.org/stamp/stamp.jsp?tp=&arnumber=8488462 (Year: 2018).*

(Continued)

*Primary Examiner* — Jeremiah L Avery

(74) *Attorney, Agent, or Firm* — Fish & Richardson P.C.

(57) ABSTRACT

Embodiments of this application disclose a security policy processing method, to implement a best-effort on-demand user plane security activation mechanism in a network in which there is a core network element that does not support on-demand user plane security protection. The security policy processing method in embodiments of this application includes: A target 1 receives a message #50-2 from a core network device #30-1, where the message #50-2 includes container information from a source access network device. The target access network device determines a user plane security activation status between the target access network device and a terminal device based on the message #50-2, where the user plane security activation status indicates whether user plane ciphering protection is activated and/or whether user plane integrity protection is activated.

20 Claims, 6 Drawing Sheets

(56)  References Cited

U.S. PATENT DOCUMENTS

| | | | | |
|---|---|---|---|---|
| 11,044,276 | B2 * | 6/2021 | Briggs ................. | H04W 12/68 |
| 11,711,455 | B2 * | 7/2023 | Dai ................... | H04W 28/0268 |
| | | | | 370/329 |
| 2018/0316690 | A1 * | 11/2018 | Cho .................... | H04W 12/106 |
| 2018/0376384 | A1 * | 12/2018 | Youn .................. | H04W 36/144 |
| 2019/0260716 | A1 * | 8/2019 | Lerner .................. | G06F 21/36 |
| 2020/0100101 | A1 * | 3/2020 | Torvinen ............ | H04W 12/033 |
| 2020/0120552 | A1 * | 4/2020 | Yang ................ | H04W 36/0069 |
| 2020/0137643 | A1 | 4/2020 | Li et al. | |
| 2020/0178326 | A1 * | 6/2020 | Sirotkin ............... | H04W 76/12 |
| 2020/0201827 | A1 * | 6/2020 | Chacko .............. | G06F 16/1824 |
| 2020/0245136 | A1 * | 7/2020 | Tang .................... | H04W 12/06 |
| 2020/0267623 | A1 * | 8/2020 | Altay ..................... | H04L 45/64 |
| 2021/0021994 | A1 * | 1/2021 | Kolekar ................. | H04W 8/24 |
| 2021/0067958 | A1 * | 3/2021 | Lee .................... | H04W 12/106 |
| 2021/0067960 | A1 * | 3/2021 | Lee ....................... | H04W 12/35 |
| 2021/0112049 | A1 * | 4/2021 | Yigit .................... | H04W 12/06 |
| 2021/0160289 | A1 * | 5/2021 | Wifvesson .......... | H04W 12/033 |

FOREIGN PATENT DOCUMENTS

| | | |
|---|---|---|
| CN | 110830992 A | 2/2020 |
| CN | 110912854 A | 3/2020 |
| CN | 111641944 A | 9/2020 |
| CN | 111866857 A | 10/2020 |

OTHER PUBLICATIONS

Witzke, Edward L. Potential uses of a wireless network in physical security systems. 44th Annual 2010 IEEE International Carnahan Conference on Security Technology. https://ieeexplore.ieee.org/stamp/stamp.jsp?tp=&arnumber=5678688 (Year: 2010).*

Liyanage, Madhusanka et al. Enhancing Security of Software Defined Mobile Networks. IEEE Access, vol. 5. https://ieeexplore.ieee.org/stamp/stamp.jsp?tp=&arnumber=7921532 (Year: 2017).*

Huawei et al., "Security context transfer following the handover from EPS to 5GS," 3GPP TSG-SA WG3 Meeting #95BIS, S2-192998, Wroclaw, PL, Aug. 26-30, 2019, 5 pages.

Qualcomm et al., "IW HO from 4G To 5G," 3GPP TSG SA WG3 (Security) Meeting #90bis, S3-180960, San Diego, US, Feb. 26-Mar. 2, 2018, 4 pages.

Extended European Search Report in European Appln No. 22736604.4, dated Jun. 12, 2024, 10 pages.

Huawei et al., "Security context transfer following the handover from EPS to 5GS," 3GPP TSG-SA WG3 Meeting #95BIS, S3-192683,Wroclaw,PL, Aug. 26-30, 2019, 5 pages.

Office Action in Australian Appln. No. 2022206514, mailed on Oct. 23, 2024, 3 pages.

Huawei et al., "A solution for UP security negotiation," 3GPP TSG SA WG3 (Security) Meeting #87, S3-171210, Ljubljana, Slovenia, May 15-19, 2017, 3 pages.

International Search Report and Written Opinion in International Appln. No. PCT/CN2022/070792, mailed on Mar. 4, 2022, 17 pages (with English translation).

Huawei, "Security context transfer following the handover from EPS to 5GS" 3GPP TSG-SA WG3 Meeting #95BIS, S3-192998, Wroclaw, PL, Aug. 26-30, 2019, 9 pages.

Office Action in Japanese Appln. No. 2023-541752, mailed on Oct. 8, 2024, 13 pages (with English translation).

* cited by examiner

SECURITY POLICY PROCESSING METHOD AND COMMUNICATION DEVICE

CROSS-REFERENCE TO RELATED APPLICATIONS

This application is a continuation of International Application No. PCT/CN2022/070792, filed on Jan. 7, 2022, which claims priority to Chinese Patent Application No. 202110027552.1, filed on Jan. 10, 2021. The disclosures of the aforementioned applications are hereby incorporated by reference in their entireties.

TECHNICAL FIELD

Embodiments of this application relate to the communication field, and in particular, to a security policy processing method and a communication device.

BACKGROUND

An on-demand user plane security protection mechanism is a security mechanism in a 5th generation mobile communication technology (5th generation mobile communication technology, 5G) network, and on-demand user plane security protection includes user plane ciphering protection and user plane integrity protection. The on-demand user plane security protection mechanism requires an access network device to determine, according to a user plane security policy received from a core network device, whether to activate user plane ciphering protection and/or user plane integrity protection with a terminal device. The on-demand user plane security protection mechanism can provide more flexible user plane security protection for the terminal device.

However, an existing 4th generation mobile communication technology (4th generation mobile communication technology, 4G) network does not support the on-demand user plane security protection mechanism. In the 4G network, user plane security between an access network device and a terminal device is fixed. To be specific, the user plane security is always that user plane ciphering protection is activated, and user plane integrity protection is not activated.

The 4G network will not sunset in the short term. In this case, how to apply the foregoing on-demand user plane security protection mechanism to the 4G network has become a research hotspot in the industry. The on-demand user plane security protection mechanism involves an access network device and a related core network device (for example, a mobility management entity (mobility management entity, MME) in the 4G network and an access and mobility management function (access and mobility management function, AMF) entity in the 5G network) in a network.

However, there may be an unupgraded access network device and an unupgraded core network device in the 4G network. The unupgraded access network device and the unupgraded core network device do not support on-demand user plane security protection. Consequently, an objective of implementing the on-demand user plane security protection cannot be achieved.

How to implement the on-demand user plane security protection mechanism in the 4G network in which there are both upgraded and unupgraded access network devices/core network devices is an urgent problem to be resolved in a current standard.

SUMMARY

Embodiments of this application provide a security policy processing method and a communication device, to implement a best-effort on-demand user plane security activation mechanism in a network in which there is a core network element that does not support on-demand user plane security protection.

According to a first aspect, an embodiment of this application provides a security policy processing method. The method includes: A target access network device receives a message #50-2 from a core network device #30-1, where the message #50-2 includes container information from a source access network device. The target access network device determines a user plane security activation status between the target access network device and a terminal device based on the message #50-2, where the user plane security activation status indicates whether user plane ciphering protection is activated and/or whether user plane integrity protection is activated.

In a possible implementation, the container information includes a user plane security policy #40-1. That the target access network device determines a user plane security activation status between the target access network device and a terminal device based on the message #50-2 includes:

The target access network device determines the user plane security activation status between the target access network device and the terminal device according to the user plane security policy #40-1. The container information is generated by the source access network device and sent to the target access network device by the core network device #30-1. The core network device #30-1 does not parse the container information, but transparently transmits the container information to the target access network device. Therefore, regardless of whether the core network device #30-1 is upgraded, it can be ensured that the target access network device can obtain a usable user plane security policy, to ensure that on-demand user plane security activation between the target access network device and the terminal device can be implemented.

In a possible implementation, the message #50-2 further includes a user plane security policy #40-2, and the container information includes a user plane security policy #40-1. The user plane security policy #40-2 may be a user plane security policy that corresponds to the terminal device and that is determined by the core network device #30-1 (for example, may be a user plane security policy stored by the core network device #30-1, or may be a user plane security policy obtained from another core network device, for example, a subscribed user plane security policy of the terminal device).

That the target access network device determines a user plane security activation status between the target access network device and a terminal device based on the message #50-2 includes: The target access network device determines the user plane security activation status between the target access network device and the terminal device according to the user plane security policy #40-2.

When the target access network device receives a plurality of user plane security policies, the target access network device may preferentially use a user plane security policy with a high priority/security level. In this embodiment of this application, the target access network device determines the user plane security activation status between the target access network device and the terminal device according to the user plane security policy #40-2 that is from the core network device #30-1. In this way, a potential bidding down attack may be effectively avoided.

In addition, in a possible implementation, before the target access network device determines the user plane security activation status between the target access network device and the terminal device according to the user plane security policy #40-2, the method further includes:

The target access network device determines whether the user plane security policy #40-2 is consistent with the user plane security policy #40-1. When the user plane security policy #40-2 is consistent with the user plane security policy #40-1, the target access network device determines the user plane security activation status between the target access network device and the terminal device according to the user plane security policy #40-2.

When the user plane security policy #40-2 is inconsistent with the user plane security policy #40-1, the target access network device determines the user plane security activation status between the target access network device and the terminal device according to the user plane security policy #40-2. Further, the target access network device may generate alarm information, where the alarm information indicates that the source access network device is in an insecure environment. Optionally, the target access network device sends the alarm information to the core network device #30-1. Subsequently, the target access network device or the core network device #30-1 may refer to the alarm information when performing a related operation. For example, in a handover procedure, handover to the source access network device is avoided as much as possible.

In a possible implementation, when the message #50-2 does not carry a user plane security policy and the container information does not carry a user plane security policy either, the target access network device determines the user plane security activation status between the target access network device and the terminal device according to a preconfigured user plane security policy #40-3.

In a possible implementation, the message #50-2 is a handover request message, and the handover request message is for requesting the target access network device to prepare a handover resource for the terminal device.

In a possible implementation, the message #50-2 further includes indication information. Before the target access network device determines the user plane security activation status between the target access network device and the terminal device based on the message #50-2, the method further includes: The target access network device determines, based on the indication information, that the terminal device supports on-demand user plane security protection.

If the terminal device does not support the on-demand user plane security protection, the target access network device may not need to determine the user plane security activation status between the target access network device and the terminal device.

According to a second aspect, an embodiment of this application provides a security policy processing method. The method includes: A source access network device obtains a user plane security policy #40-1 of a terminal device. The source access network device sends a message #50-1 to a core network device #30-1, where the message #50-1 includes container information, and the container information includes the user plane security policy #40-1. The core network device #30-1 does not parse content in the container information.

In a possible implementation, before the source access network device obtains the user plane security policy #40-1 of the terminal device, the method further includes: The source access network device determines that the terminal device supports on-demand user plane security protection.

When the terminal device does not support the on-demand user plane security protection, but the source access network device supports the on-demand user plane security protection, the source access network device may obtain a user plane security policy of the terminal device from a core network side, and store the user plane security policy in an AS context of the terminal device. If the terminal device does not support the on-demand user plane security protection, the source access network device may not need to obtain the user plane security policy in the AS context. In this way, useless information can be avoided from being transmitted in a network, and signaling is reduced.

In a possible implementation, the method further includes: The source access network device determines that the terminal device needs to be handed over to a target access network device.

In the foregoing aspect, in a handover scenario, a message #50-2 may be a handover request message, and the handover request message is for requesting the target access network device to prepare a handover resource for the terminal device. The message #50-1 includes a handover required message, and the handover required message is used by the target access network device to prepare the handover resource for the terminal device.

In a possible implementation, the message #50-2 further includes indication information. Before the target access network device determines a user plane security activation status between the target access network device and the terminal device based on the message #50-2, the method further includes: The target access network device determines, based on the indication information, that the terminal device supports the on-demand user plane security protection. The indication information is indicated by a part of bits of a security capability of the terminal device, and the security capability of the terminal device indicates at least one security algorithm that can be used by the terminal device. The security capability of the terminal device is a UE evolved packet system security capability.

According to a third aspect, an embodiment of this application provides a communication device. The communication device has a function of implementing a corresponding method implemented by each network element in embodiments of this application. The function may be implemented by hardware, or may be implemented by hardware executing corresponding software. The hardware or the software includes one or more modules corresponding to the function.

According to a fourth aspect, an apparatus is provided, including a processor and a memory. The memory is configured to store computer-executable instructions. When the apparatus runs, the processor executes the computer-executable instructions stored in the memory, so that the apparatus performs the security policy processing method according to any one of the first aspect and the second aspect. The apparatus may be specifically a network element or a chip in a network element in any security policy processing method according to the first aspect.

According to a fifth aspect, a computer-readable storage medium is provided. The computer-readable storage medium stores instructions. When the instructions are run on a computer, the computer performs the security policy processing method according to any one of the first aspect and the second aspect.

According to a sixth aspect, a computer program product including instructions is provided. When the computer program product runs on a computer, the computer performs the security policy processing method according to any one of the first aspect or the implementations of the first aspect.

For technical effects brought by any design manner of the third aspect to the sixth aspect, refer to technical effects brought by different design manners of the first aspect. Details are not described herein again.

BRIEF DESCRIPTION OF DRAWINGS

To describe the technical solutions in embodiments of this application more clearly, the following briefly describes the accompanying drawings for describing embodiments. It is clear that the accompanying drawings in the following descriptions show merely some embodiments of this application.

DESCRIPTION OF EMBODIMENTS

The following describes the technical solutions in embodiments of this application with reference to the accompanying drawings in embodiments of this application. It is clear that the described embodiments are merely a part but not all of embodiments of this application.

In the specification, claims, and accompanying drawings of this application, the terms "first", "second", "third", "fourth", and various other ordinal number terms (if existent) are intended to distinguish between similar objects but do not necessarily indicate a specific order or sequence. It should be understood that data termed in such a way is interchangeable in proper circumstances, so that embodiments described herein can be implemented in other orders than an order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

The method provided in embodiments of this application is applicable to any network in which there is a core network element that does not support on-demand user plane security protection, to implement a best-effort on-demand user plane security activation mechanism. A network architecture and a service scenario described in embodiments of this applicationtion below are intended to describe the technical solutions in embodiments of this application more clearly, and do not constitute a limitation on the technical solutions provided in embodiments of this application. A person of ordinary skill in the art may know that with evolution of the network architecture and emergence of new service scenarios, the technical solutions provided in embodiments of this application are also applicable to resolving similar technical problems.

For example, the following first describes two system architectures and application scenarios to which a security policy processing method provided in this application is applicable.

Figure 1A:
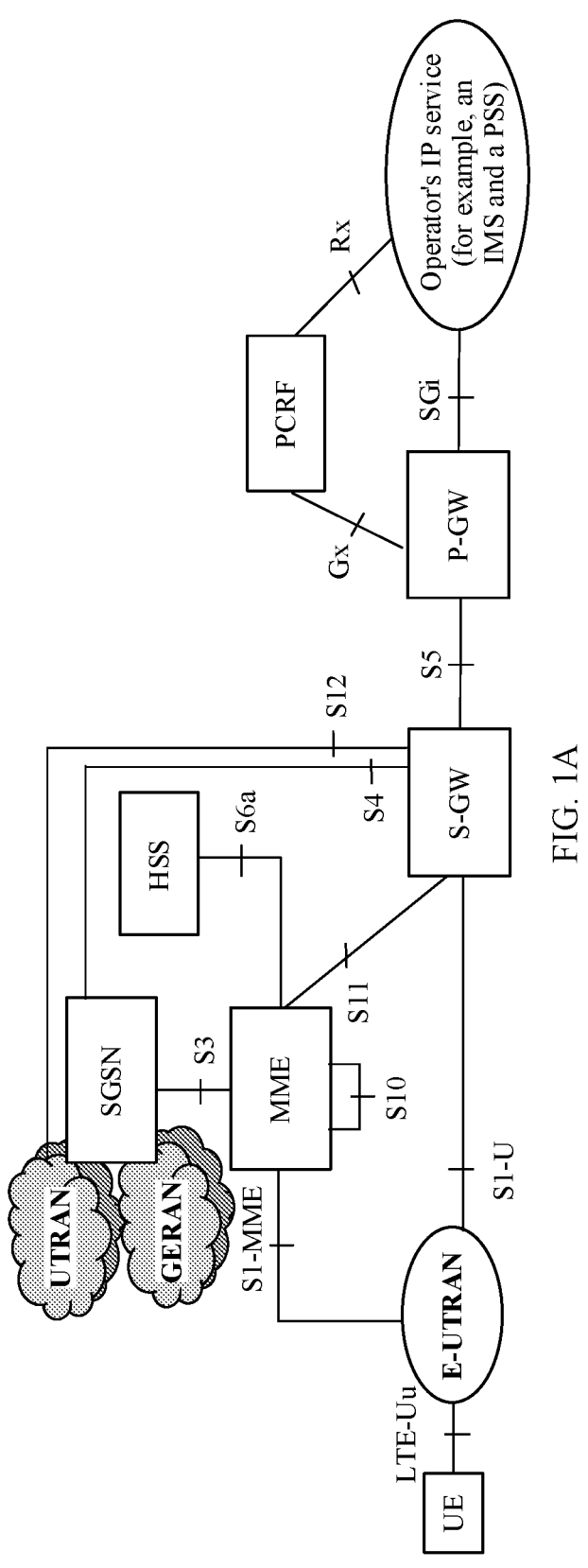
FIG. 1A is a diagram of a 4G network architecture to which a security policy processing method is applicable according to an embodiment of this application.

A scenario to which the security policy processing method provided in this application is applicable is a 4G network scenario. FIG. 1A shows a network architecture of a current long term evolution (long term evolution, LTE)/system architecture evolution (system architecture evolution, SAE). A core network part mainly includes a mobility management entity (MME), a serving gateway (serving gateway, SGW/S-GW), a packet data network gateway (packet data network gateway, PDN GW/PGW/P-GW), a home subscriber server (home subscriber server, HSS), a serving GPRS support node (serving GPRS support node, SGSN), a policy and charging rules function (policy and charging rules function, PCRF), an operator's IP service (Operator's IP Service) (for example, an IP multimedia subsystem (IP multimedia subsystem, IMS) and a packet switching service (packet switching service, PSS)), and the like. The core network may be an evolved packet core (evolved packet core, EPC). In addition, FIG. 1A further includes an access network part, namely, an evolved UMTS terrestrial radio access network (evolved UMTS terrestrial radio access network, E-UTRAN). The access network part mainly includes an access network (radio access network, RAN) device. In addition, FIG. 1A may further include a terminal device, for example, user equipment (user equipment, UE).

The mobility management entity MME is responsible for managing and storing a mobility management context (for example, an identifier of the terminal device, a mobility management status, and a user security parameter) of the terminal device, processing non-access stratum (non-access stratum, NAS) signaling (for example, an attach request (attach request), an update location request (update location request), a service request (service request), and a packet data network connectivity request (PDN connectivity request)), and is responsible for NAS signaling security and the like.

The serving gateway S-GW/SGW is a gateway that terminates a user plane interface of the access network, and performs functions such as lawful interception and packet data routing. An interface between the serving gateway S-GW and the mobility management entity MME is an S11 interface, and is responsible for exchange of session control information and the like of the terminal device.

The packet data network gateway P-GW is a gateway that terminates an SGi interface to a packet data network, provides functions such as bearer control, data forwarding, IP address allocation, and non-3GPP user access, and is an anchor point for 3GPP access and non-3GPP access to a public data network (public data network, PDN). The P-GW has a function of packet routing and forwarding, and is responsible for a policy and charging enhancement function and a user-specific packet filtering function. The P-GW is connected to the S-GW through an S5 interface, to transmit control information such as establishment, modification, and deletion of information, and packet data routing. In addition, the P-GW is further connected to the operator's IP service through the SGi interface.

The home subscriber server HSS is a core database that stores subscriber information in a home network of a subscriber. The HSS mainly includes a user profile, user subscription data, information related to user identity authentication and authorization, information related to a physical location of a user, and the like. The HSS is connected to the MME through an Sha interface, so that the MME can obtain information such as the foregoing user profile and user subscription data from the HSS.

The policy and charging rules function PCRF unit is a policy decision node for policy and charging control of a service data flow and an IP bearer resource, where a quality of service (quality of service, QoS) for a user may be controlled and differentiated services may be provided for a user. The PCRF is connected to the P-GW through a Gx interface, and is connected to the operator's IP service through an Rx interface.

In addition, the MME is connected to the E-UTRAN through an S1-MME interface, and the S-GW is connected to the E-UTRAN and the MME respectively through an S1-U interface and the S11 interface. The MIME and the S-GW are connected to 2G/3G and the SGSN respectively through an S3 interface and an S4 interface, and are respectively responsible for functions of a mobility control plane anchor and user plane anchor of the terminal device between corresponding networks. In addition, the S-GW is further connected to an evolved universal terrestrial radio access network (evolved universal terrestrial radio access network, UTRAN) through an S12 interface.

It should be noted that the foregoing 4G network architecture diagram is merely an example. In an actual network, there may be a plurality of network elements of a same type, for example, a plurality of access network devices, a plurality of MMES, and a plurality of PCRFs. In the plurality of network elements of the same type, a part of network elements may be upgraded (in embodiments of this application, the term "upgraded" is used to indicate that a network element supports an on-demand user plane security protection mechanism, and details are not described below), but a part of network elements are unupgraded (or the network element may be referred to as a legacy network element (legacy Network element, legacy NE) or an NE that does not support on-demand user plane security protection). For example, an upgraded MME and an unupgraded MME may coexist in a network.

Figure 1B:
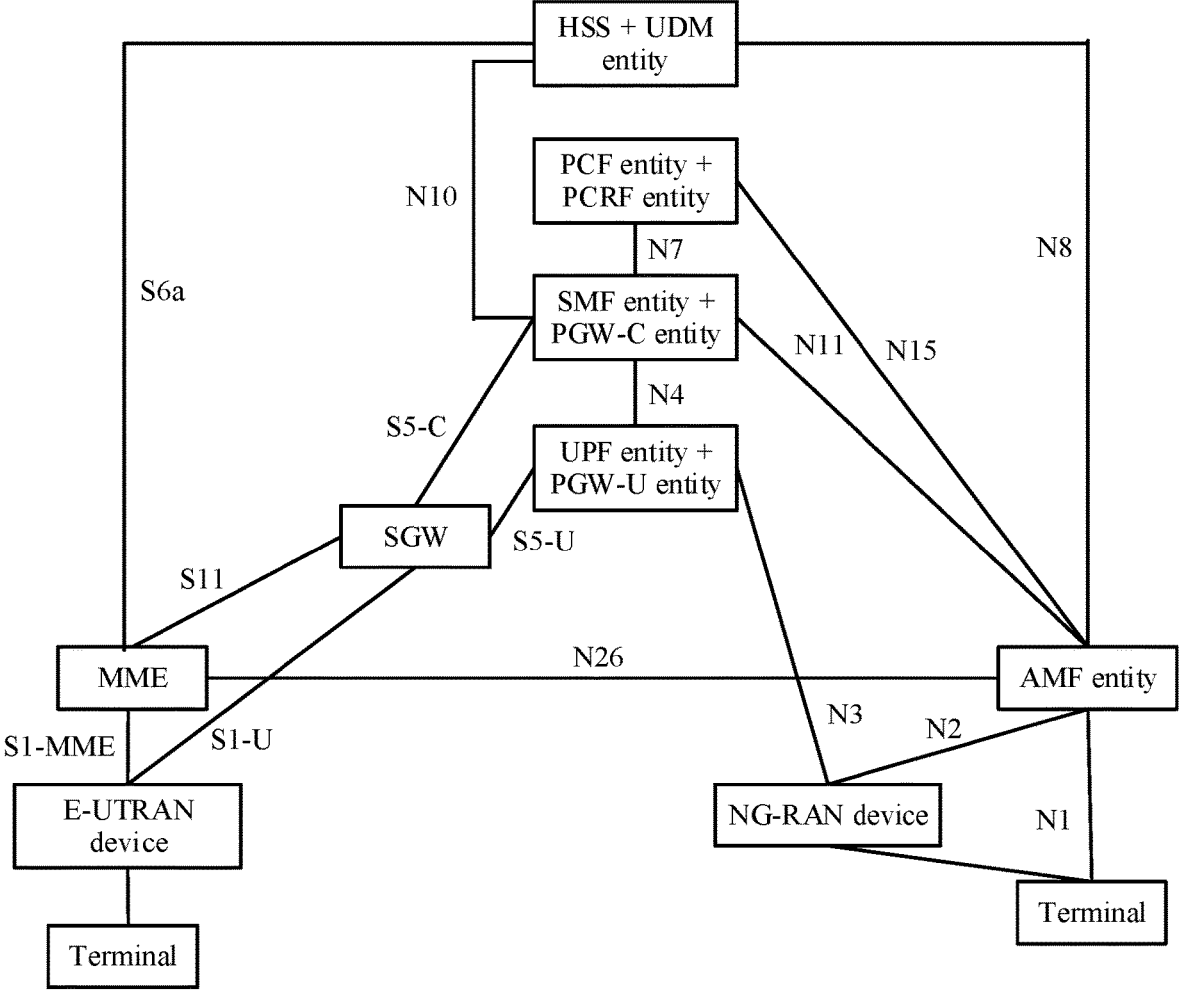
FIG. 1B is a diagram of a 5G-4G interworking architecture to which a security policy processing method is applicable according to an embodiment of this application.

Another scenario to which the security policy processing method provided in this application is applicable is a scenario for interworking (Interworking) between a 4G network and a 5G network. As shown in FIG. 1B, the 4G network and the 5G network share a user plane function (user plane function, UPF) entity+a PDN gateway user plane function (PDN gateway user plane function, PGW-U) entity, a session management function (session management function, SMF) entity+a PDN gateway control plane function (PDN gateway control plane function, PGW-C) entity, a policy control function (policy control function, PCF) entity+a policy and charging rules function (policy and charging rules function, PCRF) entity, and a home subscriber server (home subscriber server, HSS)+a unified data management (unified data management, UDM) entity. The "+" herein indicates co-deployment. A UPF is a user plane function of the 5G network, and a PGW-U is a gateway user plane function, corresponding to the UPF, of the 4G network. An SMF is a session management function of the 5G network, and a PGW-C is a gateway control plane function, corresponding to the SMF, of the 4G network. A PCF is a policy control function of the 5G network, and a PCRF is a policy and charging rules function, corresponding to the PCF, of the 4G network. Herein, the "co-deployment" may indicate that a single device has functions of two entities at the same time. In embodiments of this application, for ease of description, the HSS+the UDM entity is referred to as a user data management entity, and the PGW-C entity+the SMF entity is referred to as a control plane function entity. This is described herein, and will not be described below again. Certainly, the foregoing network device obtained through co-deployment may alternatively use another name. This is not specifically limited in embodiments of this application.

In addition, as shown in FIG. 1B, the architecture for interworking between the 4G network and the 5G network may further include an MME, a serving gateway, and an access and mobility management function (Access and Mobility Management Function, AMF) entity that is in the 5G network.

A function of the MME is the same as a function of the MME in the 4G network, and details are not described herein again.

The AMF entity is used for access and mobility management of a user, and mainly includes user registration management, reachability management, mobility management, paging management, access authentication and authorization, ciphering and integrity protection of non-access stratum signaling, and the like.

The SMF entity is used for session management of a user, and mainly includes establishment, modification, and release of a user session, IP address allocation, session policy management, and the like.

A terminal device accesses the 4G network via an evolved universal terrestrial radio access network (evolved universal terrestrial radio access network, E-UTRAN) device, and the terminal accesses the 5G network via a next generation radio access network (next generation radio access network, NG-RAN) device. The E-UTRAN device communicates with the MME through an S1-MME interface, and communicates with an SGW through an S1-U interface. The MME communicates with the SGW through an S11 interface, communicates with the user data management entity through an S6a interface, and communicates with the AMF entity through an N26 interface. The SGW communicates with the PGW-U entity+the UPF entity through an S5-U interface, and communicates with the PGW-C entity+the SMF entity through an S5-C interface. The PGW-U entity+the UPF entity communicates with the NG-RAN device through an N3 interface, and communicates with the PGW-C entity+the SMF entity through an N4 interface. The PGW-C entity+the SMF entity communicates with the PCRF entity+the PCF entity through an N7 interface. The HSS+the UDM entity communicates with the PGW-C entity+the SMF entity through an N10 interface, and communicates with the AMF entity through an N8 interface. The PCRF entity+the PCF entity communicates with the AMF entity through an N15 interface. The PGW-C entity+the SMF entity communicates with the AMF entity through an N11 interface. The AMF entity communicates with the NG-RAN device through an N2 interface, and communicates with the terminal through an N1 interface.

It should be noted that names of interfaces between network elements in FIG. 1B are merely examples. During specific implementation, the interface names may be other names. This is not specifically limited in this embodiment of this application.

Certainly, there may be another network element in the architecture for interworking between the 4G network and the 5G network. For example, the 4G network may further include a serving general packet radio system (general packet radio system, GPRS) support node (serving GPRS support node, SGSN). The 5G network may further include an authentication server function (authentication server function, AUSF) entity, a network slice selection function (network slice selection function, NSSF) entity, and the like. This is not specifically limited in this embodiment of this application.

It should be noted that the foregoing architecture for interworking between the 4G network and the 5G network is merely an example. In an actual network, there may be a plurality of network elements of a same type, for example, a plurality of access network devices and a plurality of MMES. In the plurality of network elements of the same type, a part of network elements may be upgraded but a part of network elements are unupgraded. For example, there may be both an upgraded MME and an unupgraded MME in the architecture for interworking between the 4G network and the 5G network.

An access network device in embodiments of this application is a bridge between a terminal device and a core network device, and is used for radio resource management and the like. The terminal device may access a network via the access network device. The access network device in this application may be a 4G radio access network device, or may be a device that communicates, via one or more cells, with a wireless terminal device on an air interface in a 4G access network. For example, the access network device may be an evolved NodeB (evolved NodeB, NodeB, eNB, or e-NodeB) in a long term evolution LTE system or an LTE-advanced (long term evolution advanced, LTE-A) system. Alternatively, the access network device may be a 5G radio access network device, for example, may include an NG-RAN device, a next generation evolved network base station (Next Generation E-UTRAN NodeB, ng-eNB), or a 5G base station (gNodeB, gNB). It should be noted that the access network device in this application may be an upgraded access network device (for example, an access network device that supports on-demand user plane security protection) or an unupgraded access network device (for example, an access network device that does not support on-demand user plane security protection). In addition, based on different sequences of providing a service for a terminal device, a source access network device may be understood as an access network device that provides a service for the terminal device before a handover procedure, for example, may be an access network device that provides a service for the terminal device during initial access by the terminal device; and a target access network device may be understood as an access network device that provides a service for the terminal device after the handover procedure. Usually, a context of the terminal device is transmitted between the source access network device and the target access network device. It should be understood that the access network device in embodiments of this application may be any one of the foregoing devices or a chip in the foregoing devices. This is not specifically limited herein. Either being a device or a chip, the access network device can be manufactured, sold, or used as an independent product. In this embodiment and subsequent embodiments, the access network device is used as an example for description.

In addition, a terminal device in embodiments of this application includes a device that provides voice and/or data connectivity for a user. For example, the terminal device may include a handheld device having a wireless connection function, or a processing device connected to a wireless modem. The terminal device may communicate with a core network via a radio access network RAN (for example, the foregoing source access network device or the foregoing target access network device), and may exchange voice and/or data with the RAN. The terminal device may include user equipment UE, a wireless terminal device, a mobile terminal device, a subscriber unit (subscriber unit), a subscriber station (subscriber station), a mobile station (mobile station), a mobile (mobile), a remote station (remote station), an access point (access point, AP), a remote terminal (remote terminal) device, an access terminal (access terminal) device, a user terminal (user terminal) device, a user agent (user agent), a user device (user device), or the like. In addition, the terminal device may alternatively be a vehicle-mounted terminal, for example, a telematics box (telematics box, T-Box), a domain controller (domain controller, DC), a multi domain controller (multi domain controller, MDC), or an on board unit (on board unit, OBU) that are integrated in a vehicle. The terminal device may alternatively be a wearable device, such as glasses, gloves, watches, clothing, and shoes, or another portable device that may be directly worn on a body or integrated into clothes or accessories of a user. This is not specifically limited in this application. It should be understood that the terminal device in embodiments of this application may be any one of the foregoing devices or a chip. This is not specifically limited herein. Either being a device or a chip, the terminal device can be manufactured, sold, or used as an independent product. In this embodiment and subsequent embodiments, only the terminal device is used as an example for description.

Because there may be a core network element that does not support on-demand user plane security protection in a network, in an on-demand user plane security protection procedure in which the core network element needs to be involved, an access network device may not obtain a parameter (for example, a user plane security policy) required for implementing on-demand user plane security activation, and therefore cannot implement a function of the on-demand user plane security activation between the access network device and a terminal device.

The following describes names or terms used in embodiments of this application.

A user plane security policy includes a user plane ciphering protection policy and a user plane integrity protection policy. The user plane ciphering protection policy indicates whether to activate user plane ciphering protection. The user plane integrity protection policy indicates whether to activate user plane integrity protection. There are three possible values of the user plane ciphering protection policy: not needed, preferred, and required. There are also three possible values of the user plane integrity protection policy: not needed, preferred, and required. "Not needed" indicates that protection does not need to be activated, "preferred" indicates that protection may be activated or may not be activated, and "required" indicates that protection needs to be activated. The foregoing three possible values each may be indicated by using two bits (bits). For example, 00 indicates that the protection does not need to be activated, 01 indicates that the protection may be activated or may not be activated, and 11 indicates that the protection needs to be activated. A specific manner in which the three possible values are indicated for the user plane ciphering protection policy and the user plane integrity protection policy is not limited in embodiments of this application.

The user plane ciphering protection means protecting confidentiality of data during transmission (which, therefore, may also be referred to as user plane confidentiality protection), where the confidentiality means that actual content cannot be directly seen. The user plane integrity protection means protecting integrity of data during transmission on a user plane, where the integrity means that data is original and is not tampered with.

In an on-demand user plane security protection mechanism, an access network device may determine, according to a user plane security policy of a terminal device, whether to perform on-demand user plane security protection between the access network device and the terminal device. When a value of a user plane ciphering protection policy/user plane integrity protection policy indicates "not needed", the access network device determines, according to the user plane ciphering protection policy/user plane integrity protection policy, not to activate user plane ciphering protection/user plane integrity protection between the access network device and the terminal device. When a value of a user plane ciphering protection policy/user plane integrity protection policy indicates "required", the access network device determines, according to the user plane ciphering protection policy/user plane integrity protection policy, to activate user plane ciphering protection/user plane integrity protection between the access network device and the terminal device. When a value of a user plane ciphering protection policy/ user plane integrity protection policy indicates "preferred", the access network device determines, according to the user plane ciphering protection policy/user plane integrity protection policy and other information (for example, a load status of the access network device), whether to activate user plane ciphering protection/user plane integrity protection between the access network device and the terminal device (for example, when a load is greater than a threshold, the access network device does not activate the user plane ciphering protection/user plane integrity protection; or when a load is less than or equal to a threshold, the access network device activates the user plane ciphering protection/user plane integrity protection).

A user plane security activation status indicates whether the user plane ciphering protection and/or the user plane integrity protection is activated. This may be understood as: The user plane security activation status may be a result of determining, by the access network device according to the user plane security policy of the terminal device, whether the user plane ciphering protection/user plane integrity protection is activated or not activated.

When an on-demand user plane security mechanism is applied to a 4G network, an MME may need to obtain a user plane security policy of a terminal device, and transfer the user plane security policy to an access network device. If the MME is a legacy MME, the access network device may fail to obtain the user plane security policy of the terminal device, and therefore on-demand user plane security activation cannot be implemented. Especially in a handover scenario, there may be a problem that user plane security protection is weakened.

Figure 2:
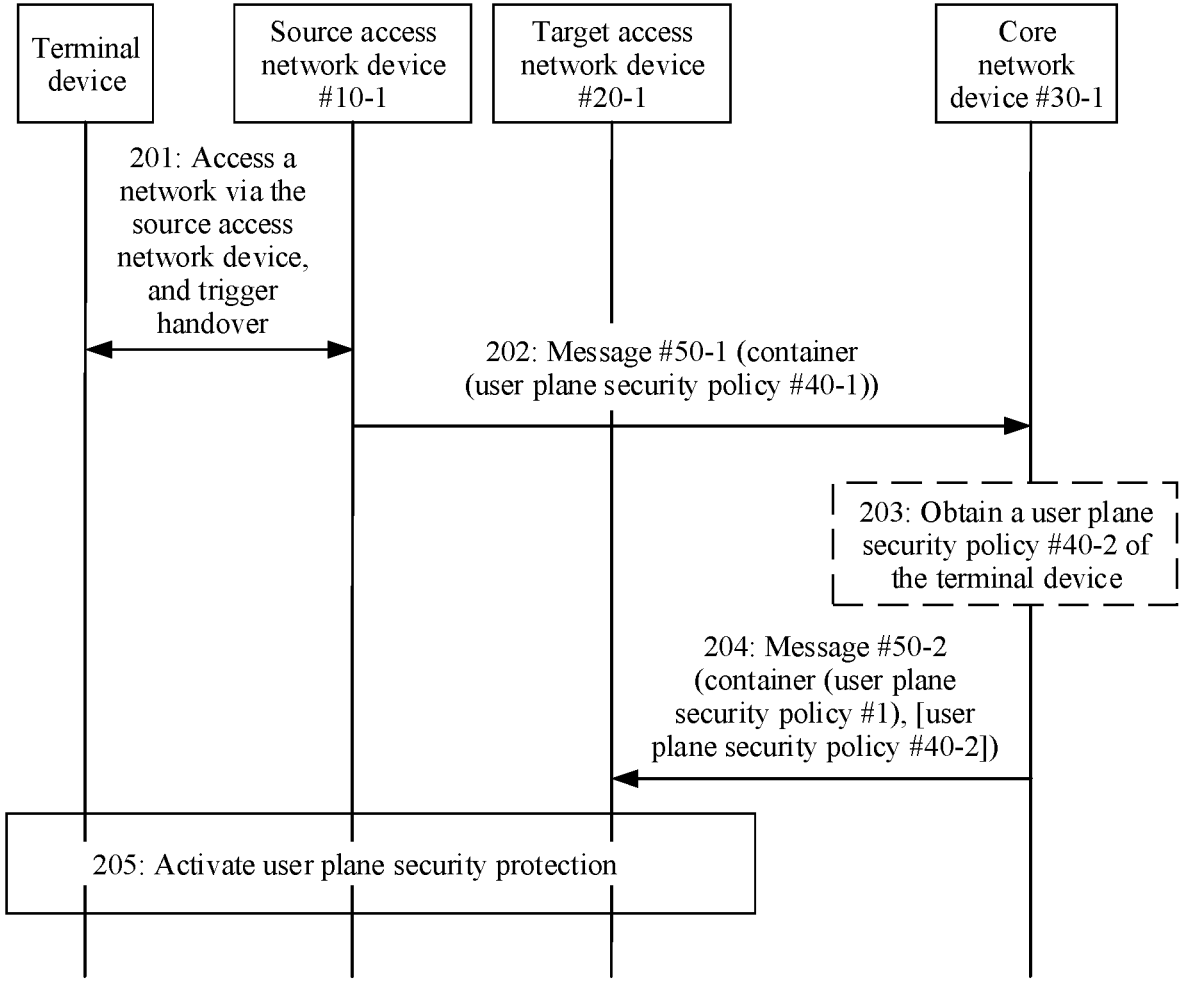
FIG. 2 is a schematic diagram of a security policy processing method according to an embodiment of this application.

As shown in FIG. 2, a security policy processing method is provided, to implement a best-effort on-demand user plane security activation mechanism in a handover scenario.

S201: A terminal device accesses a network #1 via a source access network device #10-1, and the source access network device #10-1 determines that the terminal device needs to be handed over to a target access network device #20-1.

Particularly, the handover needs to be performed via a core network device. For example, the handover may be S1 handover or 5GS-to-EPS handover. The source access network device may initiate a handover based on a trigger condition. For example, the condition may include: no X2 connection to a target access network, an X2 handover failure, the source access network device determining whether to trigger a handover based on a current running status, a poor current wireless network status, load balancing, or a voice service requirement.

When the network #1 is a 4G network, the source access network device #10-1 may be an access network device in the 4G network, for example, may be an evolved access network eNB or an evolved universal terrestrial radio access network E-UTRAN. When the network #1 is a 5G network, the source access network device #10-1 may be an access network device in the 5G network, for example, may be a next generation radio access network NG-RAN.

It should be noted that this step is optional in this embodiment of this application.

S202: The source access network device #10-1 sends a message #50-1 to a core network device #30-1. Accordingly, the core network device #30-1 receives the message #50-1 from the source access network device #10-1.

The message #50-1 includes an identifier of the terminal device and container information. The identifier of the terminal device is used to identify the terminal device, so that the core network device #30-1 obtains an access stratum (Access Stratum, AS) context of the terminal device based on the identifier of the terminal device. The container information is generated by the source access network device #10-1, and is finally transferred to the target access network device #20-1. Content in the container information is not parsed by an intermediate network element (for example, a core network device #2). For example, the container information may be a source eNB to target eNB transparent container (source eNB to target eNB transparent container). The container information may include a user plane security policy #40-1 of the terminal device.

The message #50-1 may be, for example, a handover required message, and is for requesting the target access network device #20-1 to prepare a handover resource for the terminal.

In a possible implementation, the source access network device #10-1 may determine, depending on whether the terminal device supports on-demand user plane security protection, whether to include the user plane security policy #40-1 in the container information. For example, the source access network device #10-1 includes the user plane security policy #40-1 in the container information only when the terminal device supports the on-demand user plane security protection. Specifically, the source access network device #10-1 determines, based on the AS context of the terminal device, whether the terminal device supports the on-demand user plane security protection. For example, the AS context of the terminal device includes indication information/capability information indicating whether the terminal device supports the on-demand user plane security protection, or may include information about a current user plane security activation status between the source access network device #10-1 and the terminal device. The source access network device #10-1 may determine, based on information included in the AS context of the terminal device, whether the terminal device supports the on-demand user plane security protection.

Optionally, the user plane security policy #40-1 may be a user plane security policy currently used by the source access network device #10-1 with the terminal device. For example, the user plane security policy #40-1 may be a user plane security policy in a context of the terminal device on the source access network device #10-1. In a possible implementation, when the terminal device accesses the network #1 via the source access network device #10-1, the source access network device #10-1 may obtain the user plane security policy #40-1 from a network side, and store the user plane security policy #40-1 in the AS context of the terminal device. The user plane security policy #40-1 may be, for example, a subscribed user plane security policy (subscribed UP security policy) of the terminal device.

When determining to initiate a handover, the source access network device may obtain the stored user plane security policy #40-1 from the AS context of the terminal device.

S203: The core network device #30-1 obtains a user plane security policy #40-2 of the terminal device.

The core network device #30-1 obtains the user plane security policy #40-2 from a non-access stratum (non-access stratum, NAS) context of the terminal device based on the identifier of the terminal device in the message #50-1.

It should be noted that S203 is optional. In a possible implementation, if the core network device #30-1 is a legacy network element, to be specific, does not support an on-demand user plane security mechanism, this step may fail to be performed.

S204: The core network device #30-1 sends a message #50-2 to the target access network device #20-1. Accordingly, the target access network device #20-1 receives the message #50-2 from the core network device #30-1.

The message #50-2 includes the container information. Optionally, when S203 is performed, the message #50-2 further includes the user plane security policy #40-2.

Optionally, the message #50-2 further includes indication information, where the indication information indicates whether the terminal device supports the on-demand user plane security protection. Optionally, the indication information may be indicated by a part of bits of a security capability of the terminal device, and the security capability of the terminal device indicates at least one security algorithm that can be used by the terminal device. For example, the security capability of the terminal device is a UE evolved packet system security capability (UE EPS security capability), and the indication information may be indicated by using a reserved bit, for example, EEA7 or EIA7, in the security capability of the terminal device. EEA7 represents a bit reserved for an eighth ciphering algorithm in the UE evolved packet system security capability, and EIA7 represents a bit reserved for an eighth integrity algorithm in the UE evolved packet system security capability, where in this embodiment, the bit is used for carrying an indication indicating whether the terminal device supports the on-demand user plane security protection.

The message #50-2 may be a handover request message, and the handover request message is for requesting the target access network device to prepare a handover resource for the terminal device.

S205: The target access network device #20-1 activates user plane security protection based on the message #50-2.

Specifically, when the message #50-2 does not include the user plane security policy #40-2, but the container information includes the user plane security policy #40-1, the target access network device #20-1 determines a user plane security activation status between the target access network device #20-1 and the terminal device according to the user plane security policy #40-1 in the container information.

When the message #50-2 includes the user plane security policy #40-2, the target access network device #20-1 determines a user plane security activation status between the target access network device #20-1 and the terminal device according to the user plane security policy #40-2.

Optionally, when the message #50-2 includes the user plane security policy #40-2, and the container information includes the user plane security policy #40-1, the target access network device #20-1 ignores the user plane security policy #40-1, and determines a user plane security activation status between the target access network device #20-1 and the terminal device according to the user plane security policy #40-2.

Optionally, when the message #50-2 includes the user plane security policy #40-2, and the container information includes the user plane security policy #40-1, the target access network device #20-1 determines whether the user plane security policy #40-2 is consistent with the user plane security policy #40-1. If the user plane security policy #40-2 is consistent with the user plane security policy #40-1, the target access network device #20-1 determines the user plane security activation status between the target access network device #20-1 and the terminal device according to the user plane security policy #40-2. If the user plane security policy #40-2 is inconsistent with the user plane security policy #40-1, any one of the following operations may be performed.

1. The target access network device #20-1 cancels a handover procedure. Specifically, the target access network device #20-1 sends a handover failure (handover failure) message to the core network device #30-1, to indicate that the core network device #30-1 fails to prepare the handover resource. Optionally, a cause value may be carried in the handover failure (handover failure) message. The cause value may indicate a cause of a handover failure, for example, an incorrect user plane security policy or a security risk.

2. The target access network device #20-1 determines the user plane security activation status between the target access network device #20-1 and the terminal device still according to the user plane security policy #40-2, and generates a piece of alarm information. Optionally, the target access network device #20-1 may notify the core network device #30-1 of the alarm information. The alarm information indicates a trust level of the source access network device #10-1. It may be understood that the alarm information may indicate that the source access network device #10-1 is in an insecure environment. Subsequently, the target access network device #20-1 or the core network device #30-1 may refer to the alarm information when performing a related operation. For example, in a handover procedure, handover to the source access network device #10-1 is avoided as much as possible.

3. The target access network device #20-1 selects a user plane security policy with a higher security level from the user plane security policy #40-1 and the user plane security policy #40-2, and determines the user plane security activation status between the target access network device #20-1 and the terminal device. It is considered that "required" has the highest security level and is followed by "preferred", and "not needed" has the lowest security level.

4. The target access network device #20-1 selects a user plane security policy with minimum impact on performance from the user plane security policy #40-1 and the user plane security policy #40-2, and determines the user plane security activation status between the target access network device #20-1 and the terminal device. It is considered that "not needed" has the lowest impact on performance and is followed by "preferred", and "required" has the greatest impact on performance.

5. The target access network device #20-1 selects a most balanced user plane security policy from the user plane security policy #40-1 and the user plane security policy #40-2, and determines the user plane security activation status between the target access network device #20-1 and the terminal device. It is considered that "preferred" is the most balanced.

In another possible implementation, the message #50-2 may not include the user plane security policy #40-2, and the container information does not include the user plane security policy #40-1. In this case, the target access network device #20-1 may determine the user plane security activation status between the target access network device #20-1 and the terminal device according to a preconfigured user plane security policy #40-3.

In another possible implementation, the target access network device #20-1 further receives the indication information from the core network device 30-1. The target access network device #20-1 further determines the user plane security activation status between the target access network device #20-1 and the terminal device in the manners described in the foregoing methods (1) to (5) only when the indication information indicates that the terminal device supports the on-demand user plane security protection.

The user plane security activation status indicates whether user plane ciphering protection and/or user plane integrity protection is activated.

It should be noted that the core network device #30-1 in this embodiment of this application is a general concept, and may refer to one or more network elements in a core network. For example, the core network device #30-1 may include one MME in the 4G network, or include two MMES in the 4G network, or may include one MME in the 4G network and one AMF in the 5G network. A representation form of the core network device #30-1 is not limited in embodiments of this application.

In this embodiment of this application, provided that the terminal device and the target access network device #20-1 support the on-demand user plane security protection mechanism, regardless of whether the core network device #30-1 is upgraded (to be specific, supports the on-demand user plane security protection mechanism), the target access network device #20-1 may always obtain a corresponding user plane security policy, to determine the user plane security activation status between the target access network device #20-1 and the terminal device. Particularly, according to the solution in this embodiment of this application, a problem of a bidding down attack may be further avoided effectively. For example, the source access network device #10-1 may be attacked, and does not send the user plane security policy #40-1 to the core network device #30-1, or sends a user plane security policy with a low security level (for example, a user plane security policy indicating that neither the user plane ciphering protection nor the user plane integrity protection is to be activated) to the core network device #30-1. In this case, the target access network device

20-1 may preferentially use the user plane security policy #40-2 from the core network device #30-1, to avoid a corresponding attack.

Figure 3:
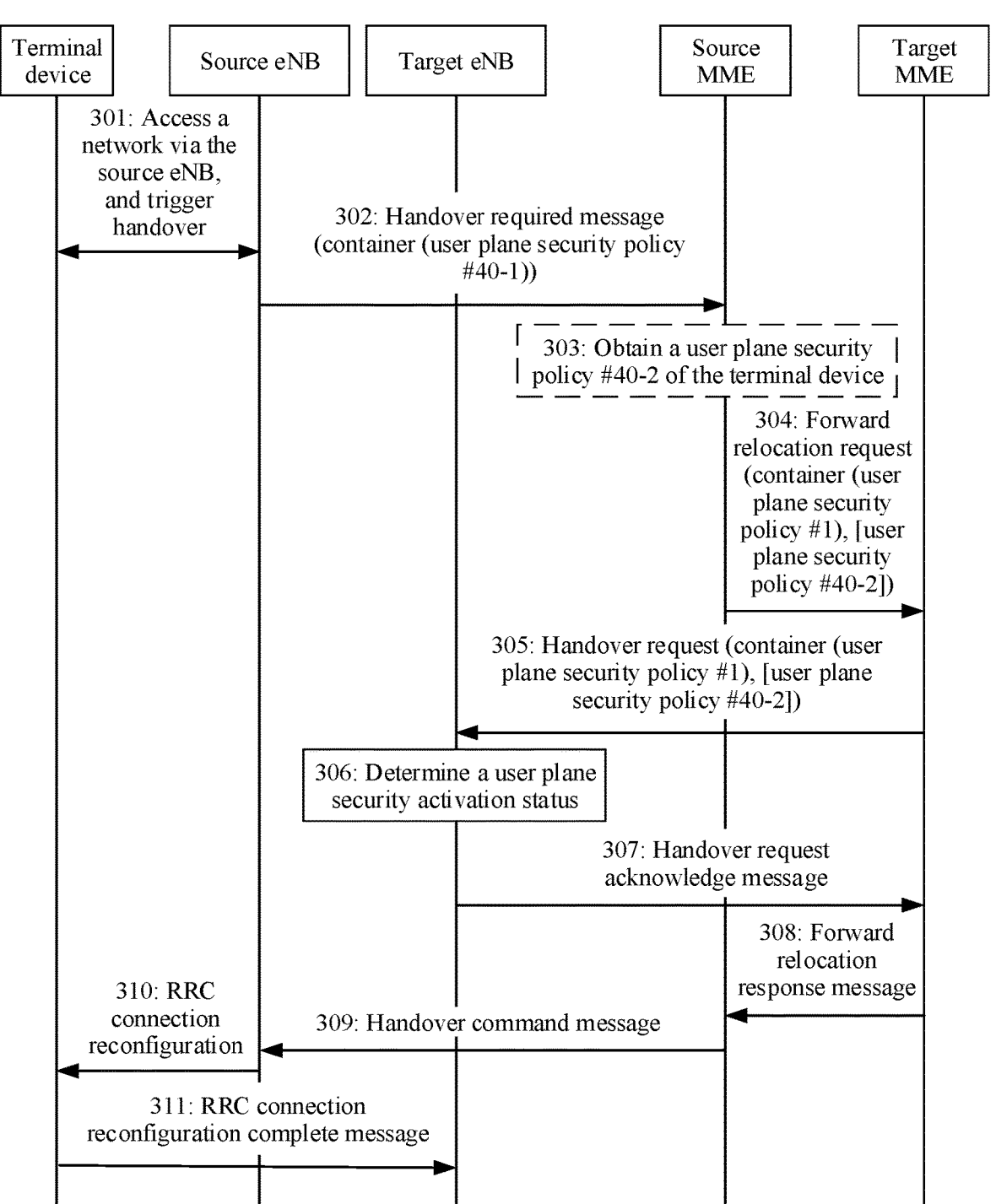
FIG. 3 is a schematic diagram of a security policy processing method in an S1 handover scenario according to an embodiment of this application.

As shown in FIG. 3, based on the architecture in FIG. 1A, a security policy processing method is provided, to implement a best-effort on-demand user plane security activation mechanism in a handover scenario.

The following uses an S1 handover procedure shown in FIG. 3 as an example for further description. An access network device (where for ease of description, a target eNB is used as an example in this embodiment of this application) in a 4G network is an implementation of the foregoing target access network device #20-1. Another access network device (where for ease of description, a source eNB is used as an example in this embodiment of this application) in the 4G network is an implementation of the foregoing source access network device #10-1. A target MME and a source MME are implementations of the core network device #30-1. In addition, it is assumed that the target eNB is an upgraded eNB (to be specific, an eNB that supports on-demand user plane security protection). The foregoing devices perform the following steps.

S301: A terminal device accesses the 4G network via the source eNB, and the source eNB determines to initiate an S1 interface-based handover, to hand over the terminal device to the target eNB.

In a process in which the terminal device accesses the 4G network, the source eNB obtains a user plane security policy of the terminal device from a core network side, and activates user plane security between the source eNB and the terminal device according to the user plane security policy. The source eNB further stores the obtained user plane security policy in an access stratum (access stratum, AS) context of the terminal device.

For example, the terminal device sends an attach request (attach request) message to an initial MME via an initial eNB. Then, the initial MME sends an identifier of the terminal device to an HSS by using an update location request (update location request) message. The HSS sends an update location request acknowledge (update location request acknowledge) message to the initial MME. The update location request acknowledge message carries subscription data of the terminal device, and the subscription data includes a subscribed user plane security policy of the terminal device. The initial MME stores the subscribed user plane security policy in a non-access stratum (non-access stratum, NAS) context of the terminal device. The initial MME sends the subscribed user plane security policy to the initial eNB in an initial context setup request (initial context setup request) message. The initial eNB stores the subscribed user plane security policy in the AS context of the terminal device.

After the terminal device accesses the 4G network, if an access network device is not changed, the initial eNB herein is the source eNB; or if an access network device is changed, the initial eNB herein and the source eNB are different access network devices. In this case, the source eNB may obtain the AS context of the terminal device from the initial eNB.

After the terminal device accesses the 4G network, if an MME is not changed, the initial MME herein is the source MME; or if an MME is changed, the initial MME herein and the source MME are different MMES. In this case, the source MME may obtain the NAS context of the terminal device from the initial MME.

It can be learned from the foregoing procedure that, when no attack occurs or no context transfer (an AS context between access network devices or a NAS context between MMES) is abnormal, a user plane security policy (namely, a user plane security policy #40-1) on the source eNB should be consistent with a user plane security policy (namely, a user plane security policy #40-2) on the source MME. A possible cause for abnormality is that the access network device or MME is not upgraded.

When the source eNB determines that the terminal device needs to be handed over to the target eNB, S1 handover may be triggered based on the following conditions:

(1) There is no X2 interface between the source eNB and the target eNB.

(2) The source eNB fails to perform X2 handover to the target eNB, and the source eNB receives an error indication from the target eNB.

(3) Information dynamically learned by the source eNB, configuration information on the source eNB, or the like.

S302: The source eNB sends a handover required (handover required) message to the source MME.

The handover required message carries the identifier of the terminal device and container information (a source eNB to target eNB transparent container). The identifier, for example, an eNB UE S1AP ID and an MME UE S1AP ID, of the terminal device is for obtaining a context of the terminal device.

The container information is generated by the source eNB and finally transferred to the target eNB, and is not parsed by an intermediate network element (such as the source MME and the target MME).

The container information optionally includes the user plane security policy (namely, the user plane security policy #40-1) that is of the terminal device and that is stored by the source eNB.

For a specific case, refer to related descriptions in S202. Details are not described herein again.

S303: The source MME obtains the user plane security policy #40-2 of the terminal device.

This step is the same as S203, and details are not described herein again.

S304: The source MME sends a forward relocation request (forward relocation request) message to the target MME.

The forward relocation request message carries the container information. Particularly, the source MME does not parse the container information, but directly forwards the container information.

The forward relocation request message may further carry the user plane security policy (namely, the user plane security policy #40-2) that is of the terminal device and that is stored by the source MME. For example, the source MME obtains the NAS context of the terminal device based on the identifier of the terminal device, and obtains the user plane security policy #40-2 from the NAS context of the terminal device.

Optionally, the forward relocation request message further includes indication information, where the indication information indicates whether the terminal device supports the on-demand user plane security protection. Optionally, if the source MME is a legacy MME, the source MME may not locally store a user plane security policy, and therefore does not send the user plane security policy to the target MME.

For related content, for example, related descriptions of the indication information, refer to related descriptions in S204. Details are not described herein again.

S305: The target MME sends a handover request (handover request) message to the target eNB.

The handover request message is for requesting the target eNB to prepare a handover resource for the terminal device.

The handover request message carries the container information. Optionally, the handover request message may further carry the user plane security policy #40-2 of the terminal device and optionally carry the indication information.

It should be noted that if the target MME is a legacy MME, the target MME may not send the user plane security policy #40-2 to the target eNB. This is because the legacy MME may fail to identify the information element. As a result, the legacy MME discards or cannot process the information element.

S306: The target eNB determines a user plane security activation status, where the user plane security activation status indicates whether to activate user plane ciphering protection and/or user plane integrity protection.

In an optional implementation (1), if the handover request message carries the user plane security policy #40-2 of the terminal device, the target eNB determines the user plane security activation status between the target eNB and the terminal device according to the user plane security policy #40-2. It should be understood that when the handover request message carries the user plane security policy #40-2 of the terminal device, even if the container information carries the user plane security policy #40-1, the target eNB ignores the user plane security policy #40-1. The target eNB determines the user plane security activation status between the target eNB and the terminal device according to the user plane security policy #40-2.

In an optional implementation (2), if the handover request message does not carry the user plane security policy #40-2 of the terminal device, but the container information carries the user plane security policy #40-1, the target eNB determines the user plane security activation status between the target eNB and the terminal device according to the user plane security policy #40-1.

In an optional implementation (3), if the handover request message carries the user plane security policy #40-2 of the terminal device, and the container information carries the user plane security policy #40-1, the target eNB compares the user plane security policy #40-1 with the user plane security policy #40-2. If the user plane security policy #40-1 is consistent with the user plane security policy #40-2, the target eNB determines the user plane security activation status between the target eNB and the terminal device according to the user plane security policy #40-2. Alternatively, if the user plane security policy #40-1 is inconsistent with the user plane security policy #40-2, the target eNB initiates a handover cancellation procedure.

In another optional implementation (4), if the handover request message does not carry the user plane security policy #40-2 of the terminal device, the container information does not carry the user plane security policy #40-1, and a user plane security policy #40-3 is preconfigured on the target eNB, the target eNB determines the user plane security activation status between the target eNB and the terminal device according to the user plane security policy configured on the target eNB.

In another optional implementation (5), the target eNB further receives the indication information from the target MIME. The target eNB further determines the user plane security activation status between the target eNB and the terminal device in the manners described in the foregoing methods (1) to (4) only when the indication information indicates that the terminal device supports the on-demand user plane security protection.

In another optional implementation (6), if the handover request message does not carry the user plane security policy #40-2 of the terminal device, and the container information does not carry the user plane security policy #40-1, the target eNB may determine the user plane security activation status for the terminal device in an unupgraded manner, to be specific, always activates ciphering protection but does not activate integrity protection.

During specific implementation, for a method in addition to the foregoing six implementations for determining, by the target eNB, a user plane security policy used between the target eNB and the terminal device, further refer to related descriptions in S205. Details are not described herein again.

S307: The target eNB sends a handover request acknowledge (handover request acknowledge) message to the target MIME.

The handover request acknowledge message includes a radio resource control RRC connection reconfiguration (RRC connection reconfiguration), and the RRC connection reconfiguration is constructed by the target eNB.

Optionally, the RRC connection reconfiguration carries configuration information, and the configuration information indicates whether the terminal device activates the user plane ciphering protection and/or the user plane integrity protection. Optionally, the configuration information is determined by the user plane security activation status in S306.

Specifically, if a ciphering disabled (ciphering disabled) field is encapsulated in the configuration information, the terminal device does not activate the ciphering protection; or if no ciphering disabled (ciphering disabled) field is encapsulated in the configuration information, the terminal device activates the ciphering protection. If an integrity protection (integrity protection) field is encapsulated in the configuration information, the terminal device activates the integrity protection; or if no integrity protection (integrity protection) field is encapsulated in the configuration information, the terminal device does not activate the integrity protection.

It should be understood that, the target eNB encapsulates the user plane security activation status in the RRC connection reconfiguration by using the configuration information, and sends the RRC connection reconfiguration to the source eNB by using the handover request acknowledge. Then, the source eNB forwards, to the terminal device, the RRC connection reconfiguration in which the user plane security activation status is encapsulated.

S308: The target MME sends a forward relocation response (forward relocation response) message to the source MME.

The forward relocation response message includes the foregoing RRC connection reconfiguration, and the RRC connection reconfiguration carries the configuration information.

S309: The source MME sends a handover command (handover command) message to the source eNB.

The handover command message includes the foregoing RRC connection reconfiguration, and the RRC connection reconfiguration carries the configuration information.

S310: The source eNB sends the RRC connection reconfiguration to the terminal device.

In other words, the source eNB forwards, to the terminal device, the RRC connection reconfiguration received from the target eNB.

Specifically, the terminal device determines, based on the configuration information carried in the RRC connection reconfiguration, whether to activate the user plane ciphering protection/user plane integrity protection between the terminal device and the target eNB.

For example, the terminal device determines that the ciphering disabled (ciphering disabled) field and the integrity protection (integrity protection) field are not encapsulated in the configuration information. Therefore, the terminal device activates the ciphering protection but does not activate the integrity protection. The terminal device determines that the ciphering disabled (ciphering disabled) field is encapsulated in the configuration information but the integrity protection (integrity protection) field is not encapsulated in the configuration information. Therefore, the terminal device neither activates the ciphering protection nor activates the integrity protection. The terminal device determines that the ciphering disabled (ciphering disabled) field is not encapsulated in the configuration information but the integrity protection (integrity protection) field is encapsulated in the configuration information. Therefore, the terminal device activates both the ciphering protection and the integrity protection. The terminal device determines that the ciphering disabled (ciphering disabled) field and the integrity protection (integrity protection) field are encapsulated in the configuration information. Therefore, the terminal device does not activate the ciphering protection but activates the integrity protection.

S311: The terminal device sends an RRC connection reconfiguration complete message to the target eNB.

The RRC connection reconfiguration complete (RRC connection reconfiguration Complete) message indicates, to the target eNB, that the terminal device has completed an RRC connection reconfiguration procedure, and the terminal device is successfully handed over from the source eNB to the target eNB. Subsequently, the terminal device may communicate directly with the target eNB.

In this embodiment of this application, regardless of whether the source eNB, the source MME, or the target MME is upgraded, the target eNB can obtain a usable user plane security policy, and determine a user plane security protection status between the target eNB and the terminal device according to the obtained user plane security policy. This avoids a problem that an on-demand user plane security mechanism cannot be implemented because a user plane security policy is lost due to a part of unupgraded network elements in a source eNB, a source MME, or a target MME in the 4G network. In addition, in this embodiment of this application, the target eNB may further obtain a security policy with a higher priority as much as possible, to ensure, with the best effort, that user plane security protection is activated or not activated for the terminal device according to a most preferred user plane security policy in a handover process, so that a potential bidding down attack is avoided.

Figure 4:
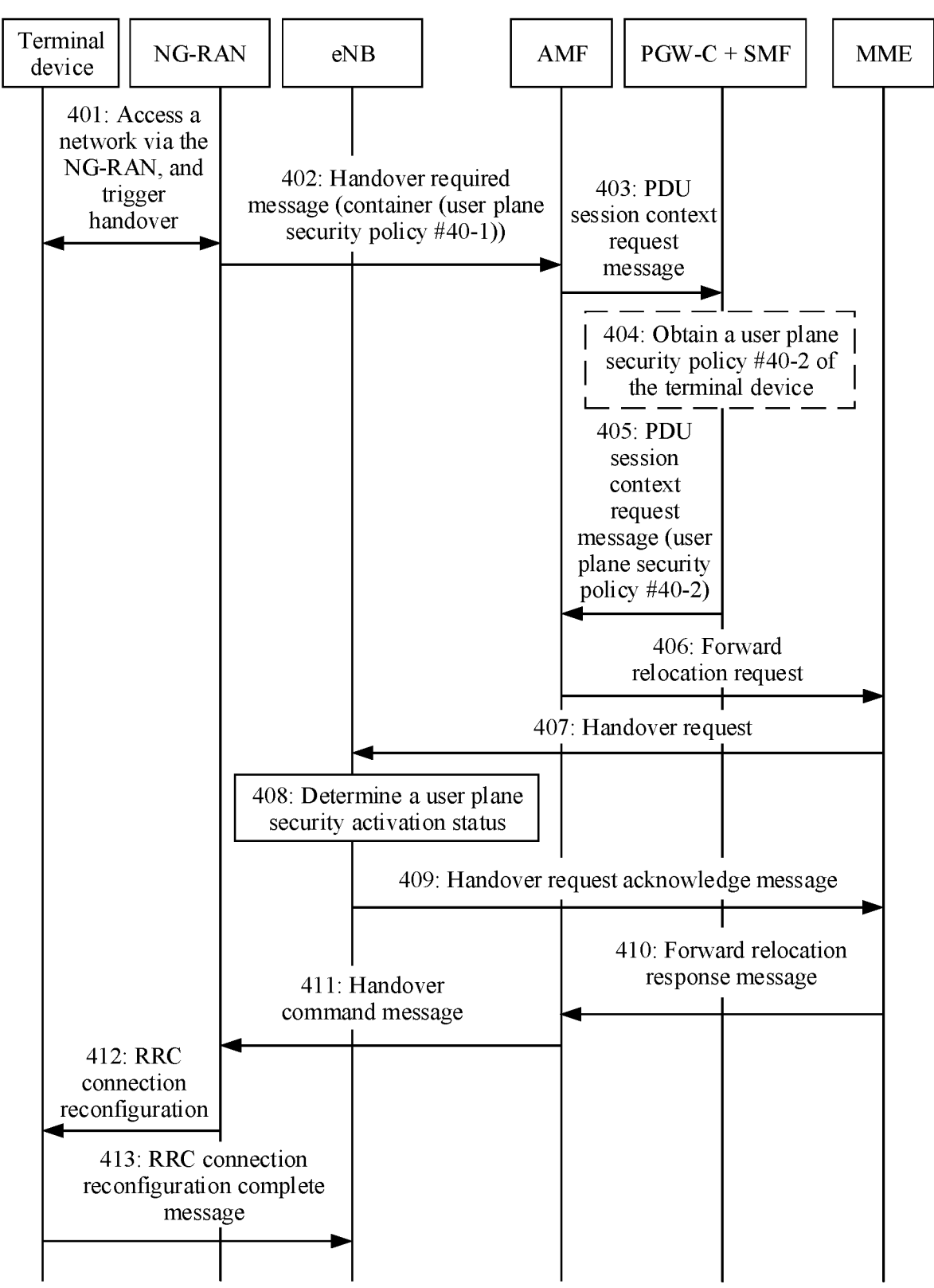
FIG. 4 is a schematic diagram of a security policy processing method in a 5GS-to-EPS handover scenario according to an embodiment of this application.

As shown in FIG. 4, based on the architecture in FIG. 1B, a security policy processing method is provided, to implement a best-effort on-demand user plane security activation mechanism in a 5GS-to-EPS handover scenario.

An access network device (where for ease of description, a target eNB is used as an example in this embodiment of this application, and is referred to as an eNB for short in this embodiment below) in a 4G network is an implementation of the foregoing target access network device. An access network device (where for ease of description, a source NG-RAN is used as an example in this embodiment of this application, and is referred to as an NG-RAN for short in this embodiment below) in a 5G network is an implementation of the foregoing source access network device. A core network device (where for ease of description, a source AMF is used as an example in this embodiment of this application, and is referred to as a source AMF for short in this embodiment below) in the 5G network and a core network device (where for ease of description, a target MME is used as an example in this embodiment of this application, and is referred to as an MME for short in this embodiment below) in the 4G network are implementations of the foregoing core network device #30-1. In addition, it is assumed that the eNB is an upgraded eNB (to be specific, an eNB that supports on-demand user plane security protection). The foregoing devices perform the following steps.

S401: A terminal device accesses the 5G network via the NG-RAN, and the NG-RAN determines to initiate a 5GS-to-EPS handover, to hand over the terminal device to the eNB in the 4G network.

In a process in which the terminal device accesses the 5G network, the NG-RAN obtains a user plane security policy of the terminal device from a core network side, and activates user plane security between the NG-RAN and the terminal device according to the user plane security policy. The NG-RAN further stores the obtained user plane security policy in an access stratum (access stratum, AS) context of the terminal device.

For example, the terminal device sends a protocol data unit (protocol data unit, PDU) session setup request message to the NG-RAN. The NG-RAN sends the PDU session setup request to a PWG-C+an SMF via an AMF. The PWG-C+the SMF may obtain, from an HSS+a UDM, a subscribed user plane security policy of the terminal device, or may obtain a user plane security policy from local configuration information of the PWG-C+the SMF. The user plane security policy obtained by the PWG-C+the SMF is the user plane security policy of the terminal device, and may be specifically a user plane security policy specific to a PDU session. The PWG-C+the SMF may store, in a context of the terminal device, the subscribed user plane security policy obtained from the HSS+the UDM. The PWG-C+the SMF sends the obtained user plane security policy to the NG-RAN via the AMF. The NG-RAN stores the subscribed user plane security policy in the AS context of the terminal device.

Therefore, in a normal case, the user plane security policy stored in the NG-RAN should be consistent with the user plane security policy stored in the PWG-C+the SMF.

When the source NG-RAN determines that the terminal device needs to be handed over to the target eNB, the 5GS-to-EPS handover may be triggered based on the following conditions:

(1) a poor current wireless network status;
(2) load balancing; and
(3) a voice service requirement.

S402: The NG-RAN sends a handover required (handover required) message to the AMF.

The handover required message carries an identifier of the terminal device and container information. The identifier, for example, a RAN UE NGAP ID and an AMF UE NGAP ID, of the terminal device is for obtaining the context of the terminal device.

The container information is generated by the NG-RAN and finally transferred to the eNB, and is not parsed by an intermediate network element, including the AMF and the MME. For related descriptions, refer to related descriptions in S202 and S302. Details are not described herein again.

S403: The AMF sends a PDU session context request message to the PGW-C+the SMF.

The PDU session context request message may include a context identifier of the terminal device, and the context identifier, for example, a session management context identifier (Session Management Context ID), of the terminal device may be obtained based on the identifier of the terminal device.

S404: The PGW-C+the SMF obtains a user plane security policy #40-3 of the terminal device.

Specifically, the PGW-C+the SMF obtains the user plane security policy #40-3 of the terminal device based on the context identifier of the terminal device. The user plane security policy #40-3 may be a user plane security policy stored in the context of the terminal device, or may be a user plane security policy obtained through mapping according to a user plane security policy stored in the context of the terminal device.

It should be understood that if the PGW-C+the SMF is an unupgraded core network device, the PGW-C+the SMF may not perform S404.

S405: The PGW-C+the SMF sends a PDU session context response message to the AMF.

The PDU session context response message includes the user plane security policy #40-3 of the terminal device.

It should be understood that if the PGW-C+the SMF is an unupgraded core network device, the PDU session context response message may not carry the user plane security policy #40-3.

S406: The AMF sends a forward relocation request (forward relocation request) message to the MME.

S407: The MME sends a handover request (handover request) message to the eNB.

S408: The eNB determines a user plane security activation status.

S409: The eNB sends a handover request acknowledge (handover request acknowledge) message to the MME.

S410: The MME sends a forward relocation response (forward relocation response) message to the AMF.

S411: The AMF sends a handover command (handover command) message to the eNB.

S412: The NG-RAN sends RRC connection reconfiguration to the terminal device.

S413: The terminal device sends an RRC connection reconfiguration complete message to the eNB.

Related descriptions in S406 to S413 are the same as those in S304 to S311. Refer to the foregoing descriptions. Details are not described herein again.

In this embodiment of this application, regardless of whether the PGW-C+the SMF and the MME are upgraded, the eNB can obtain a usable user plane security policy, and determine a user plane security protection status between the eNB and the terminal device according to the obtained user plane security policy. This avoids a problem that an on-demand user plane security mechanism cannot be implemented because a user plane security policy is lost due to a part of unupgraded network elements in a source eNB, a source MME, or a target MME in the 4G network. In addition, in this embodiment of this application, the target eNB may further obtain a security policy with a higher priority as much as possible, to ensure, with the best effort, that user plane security protection is activated or not activated for the terminal device according to a most preferred user plane security policy in a handover process, so that a potential bidding down attack is avoided.

Figure 5:
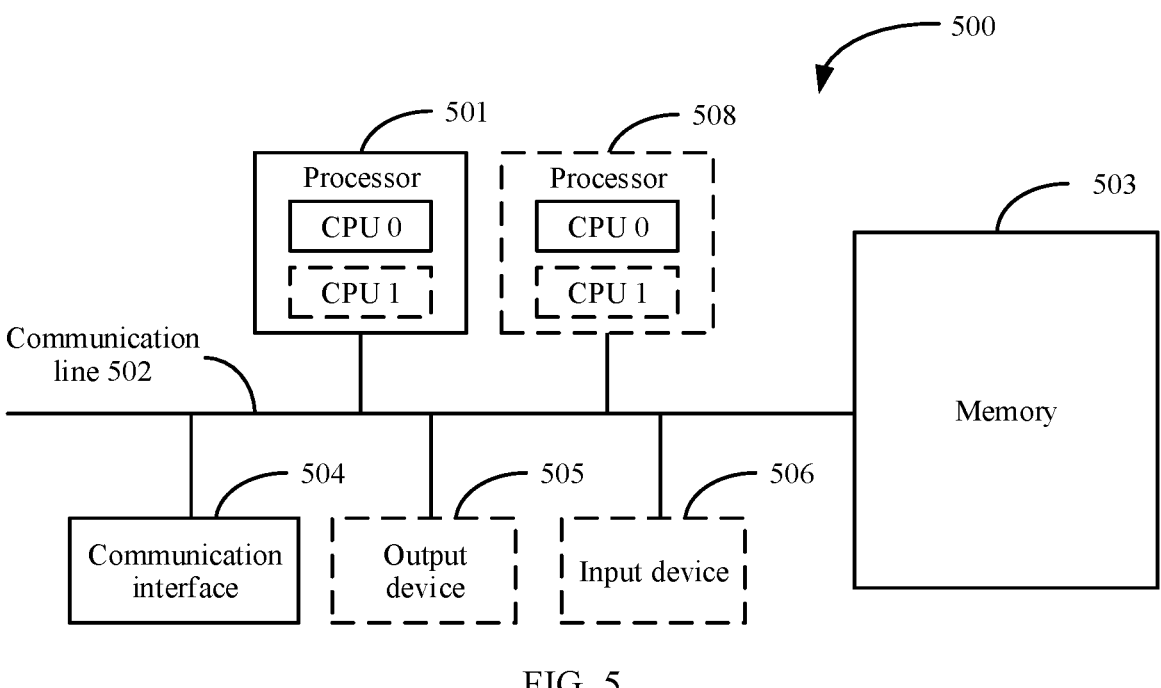
FIG. 5 is a schematic diagram of a structure of a communication device according to an embodiment of this application.

FIG. 5 is a schematic diagram of a hardware structure of a communication device according to an embodiment of this application. The communication device 500 includes at least one processor 501, a communication line 502, a memory 503, and at least one communication interface 504.

The processor 501 may be a general-purpose central processing unit (central processing unit, CPU), a microprocessor, an application-specific integrated circuit (application-specific integrated circuit, ASIC), or one or more integrated circuits configured to control program execution of the solutions of this application.

The communication line 502 may include a path on which information is transmitted between the foregoing components.

The communication interface 504 is an apparatus that uses any transceiver, and is configured to communicate with another device or a communication network, such as the Ethernet, a radio access network (radio access network, RAN), or a wireless local area network (wireless local area network, WLAN).

The memory 503 may be a read-only memory (read-only memory, ROM), another type of static storage device that can store static information and instructions, a random access memory (random access memory, RAM), or another type of dynamic storage device that can store information and instructions; or may be an electrically erasable programmable read-only memory (electrically erasable programmable read-only memory, EEPROM), a compact disc read-only memory (compact disc read-only memory, CD-ROM), another compact disc storage, an optical disc storage (including a compact disc, a laser disc, an optical disc, a digital versatile disc, a Blu-ray disc, and the like), a magnetic disk storage medium, another magnetic storage device, or any other medium that can carry or store expected program code in a form of an instruction or a data structure and that can be accessed by a computer, but is not limited thereto. The memory may exist independently, and connect to the processor through the communication line 502. The memory may alternatively be integrated with the processor.

The memory 503 is configured to store computer-executable instructions for performing the solutions in this application, and the processor 501 controls execution. The processor 501 is configured to execute the computer-executable instructions stored in the memory 503, to implement the security policy processing method provided in the foregoing embodiments of this application.

Optionally, the computer-executable instructions in this embodiment of this application may also be referred to as application program code. This is not specifically limited in this embodiment of this application.

During specific implementation, in an embodiment, the processor 501 may include one or more CPUs, for example, a CPU 0 and a CPU 1 in FIG. 5.

During specific implementation, in an embodiment, the communication device 500 may include a plurality of processors, for example, the processor 501 and a processor 508 in FIG. 5. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the communication device 500 may further include an output device 505 and an input device 506. The output device 505 communicates with the processor 501, and may display information in a plurality of manners. For example, the output device 505 may be a liquid crystal display (liquid crystal display, LCD), a light emitting diode (light emitting diode, LED) display device, a cathode ray tube (cathode ray tube, CRT) display device, or a projector (projector). The input device 506 communicates with the processor 501, and may receive user input in a plurality of manners. For example, the input device 506 may be a mouse, a keyboard, a touchscreen device, or a sensor device.

The communication device 500 may be a general-purpose device or a dedicated device. During specific implementation, the communication device 500 may be any network element in the embodiments in FIG. 2 to FIG. 4, for example, a source access network device, a target access network device, an AMF, an MME, or a PGW-C+an SMF. A type of the communication device 500 is not limited in this embodiment of this application.

The foregoing in FIG. 2 to FIG. 4 mainly describes the solutions provided in embodiments of this application from the perspective of the methods. It may be understood that, to implement the foregoing functions, a communication apparatus includes corresponding hardware structures and/or software modules for performing the functions. A person of ordinary skill in the art should easily be aware that, in combination with the example modules and algorithm steps described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method examples. For example, each functional module may be obtained through division based on each function, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used.

Figure 6:
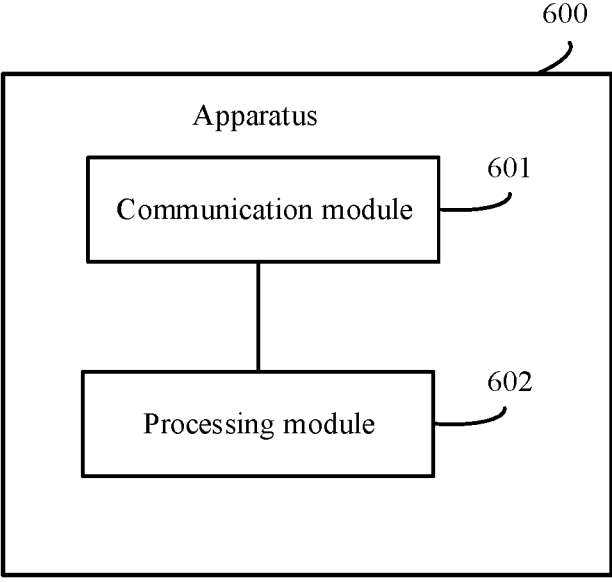
FIG. 6 is a schematic diagram of a structure of another communication device according to an embodiment of this application.

The following describes in detail a communication apparatus in this application. Refer to FIG. 6. FIG. 6 is a schematic diagram of an embodiment of a communication apparatus according to an embodiment of this application. The communication apparatus may be any network element in the embodiments in FIG. 2 to FIG. 4, for example, a source access network device, a target access network device, an AMF, an MME, or a PGW-C+an SMF. The communication apparatus includes a communication module 601 and a processing module 602. The communication module 601 is configured to implement message receiving and sending functions, and the processing module 602 is configured to perform a related processing function.

When the communication apparatus is the source access network device, the communication module 601 is configured to perform content related to S202, S302, S402, S309, S310, S411, and S412 in FIG. 2 to FIG. 4.

Particularly, the processing module 602 is configured to obtain a user plane security policy #40-1 of a terminal device.

Optionally, the processing module 602 is further configured to determine, depending on whether the terminal device supports on-demand user plane security protection, whether to include the user plane security policy #40-1 in container information.

When the communication apparatus is the target access network device, the communication module 601 is configured to receive a message #50-2 from a core network device #30-1, where the message #50-2 includes container information from a source access network device; and the processing module 602 is configured to determine a user plane security activation status between the target access network device and a terminal device based on the message #50-2, where the user plane security activation status indicates whether user plane ciphering protection is activated and/or whether user plane integrity protection is activated.

In a possible implementation, the container information includes a user plane security policy #40-1. The processing module 602 is specifically configured to determine the user plane security activation status between the target access network device and the terminal device according to the user plane security policy #40-1.

In a possible implementation, the message #50-2 further includes a user plane security policy #40-2, and the container information includes a user plane security policy #40-1. The processing module 602 is specifically configured to determine the user plane security activation status between the target access network device and the terminal device according to the user plane security policy #40-2. Specifically, the processing module 602 is configured to: ignore the user plane security policy #40-1, and determine the user plane security activation status between the target access network device and the terminal device directly according to the user plane security policy #40-2.

In a possible implementation, the processing module 602 is further configured to determine whether the user plane security policy #40-2 is consistent with the user plane security policy #40-1.

In a possible implementation, the processing module 602 is further configured to generate alarm information, where the alarm information indicates that the source access network device #10-1 is in an insecure environment. Optionally, the communication module 601 is further configured to send the alarm information to the core network device #30-1.

In a possible implementation, the processing module 602 is further configured to: when the message #50-2 does not carry a user plane security policy and the container information does not carry a user plane security policy either, determine the user plane security activation status between the target access network device and the terminal device according to a preconfigured user plane security policy.

In a possible implementation, the message #50-2 further includes indication information. The processing module 602 is further configured to determine, based on the indication information, that the terminal device supports on-demand user plane security protection.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

In an example, a unit in any one of the foregoing communication apparatuses may be one or more integrated circuits configured to implement the foregoing methods, for example, one or more application-specific integrated circuits (application-specific integrated circuits, ASICs), one or more microprocessors (digital signal processors, DSPs), one or more field programmable gate arrays (field programmable gate arrays, FPGAs), or a combination of at least two of these forms of integrated circuits. For another example, when the units in the communication apparatus may be implemented in a form of scheduling a program by a processing element, the processing element may be a general-purpose processor, for example, a central processing unit (central processing unit, CPU) or another processor that can invoke the program. For still another example, the units may be integrated and implemented in a form of a system-on-a-chip (system-on-a-chip, SOC).

This application further provides a communication system, including at least one or more of a network device or a terminal device.

An embodiment of this application further provides a computer-readable storage medium, including instructions. When the instructions are run on a computer, the computer controls a network device or a terminal device to perform any implementation shown in the foregoing method embodiments.

An embodiment of this application further provides a computer program product. The computer program product includes computer program code. When the computer program code is run on a computer, the computer performs any implementation shown in the foregoing method embodiments.

An embodiment of this application further provides a chip system, including a memory and a processor. The memory is configured to store a computer program, and the processor is configured to invoke the computer program from the memory and run the computer program, so that a chip performs any implementation shown in the foregoing method embodiments.

An embodiment of this application further provides a chip system, including a processor. The processor is configured to invoke and run a computer program, so that a chip performs any implementation shown in the foregoing method embodiments.

All or a part of the technical solutions provided in embodiments of this application may be implemented by using software, hardware, firmware, or any combination thereof. When software is used to implement embodiments, all or a part of the embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, an AI node, an access network device, a terminal device, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium, or the like.

In embodiments of this application, when there is no logical conflict, embodiments may be mutually referenced. For example, methods and/or terms in the method embodiments may be mutually referenced, and functions and/or terms in the apparatus embodiments may be mutually referenced. For example, functions and/or terms between the apparatus embodiments and the method embodiments may be mutually referenced.

It is clear that a person skilled in the art can make various modifications and variations to this application without departing from the scope of this application. This application is intended to cover these modifications and variations of this application provided that they fall within the scope of protection defined by the following claims and their equivalent technologies.

The invention claimed is:

1. A security policy processing method, comprising:
  receiving, by a target access network device, a message (#50-2) from a core network device (#30-1), wherein the message (#50-2) comprises container information generated by a source access network device; and
  determining, by the target access network device, a user plane security activation status between the target access network device and a terminal device based on the message (#50-2), wherein the user plane security activation status indicates at least one of whether user plane ciphering protection is activated or whether user plane integrity protection is activated;
  wherein determining, by the target access network device, the user plane security activation status between the target access network device and the terminal device based on the message (#50-2) comprises:
    when the message (#50-2) further comprises a user plane security policy (#40-2) and the container information comprises a user plane security policy (#40-1), determining, by the target access network device, the user plane security activation status according to the user plane security policy (#40-2).

2. The method according to claim 1, wherein determining, by the target access network device, the user plane security activation status between the target access network device and the terminal device according to the user plane security policy (#40-2) comprises:
  ignoring, by the target access network device, the user plane security policy (#40-1); and
  determining, by the target access network device, the user plane security activation status directly according to the user plane security policy (#40-2).

3. The method according to claim 1, wherein determining, by the target access network device, the user plane security activation status between the target access network device and the terminal device based on the message (#50-2) further comprises:
  when neither the message (#50-2) nor the container information comprises a user plane security policy, determining, by the target access network device, the user plane security activation status according to a preconfigured user plane security policy (#40-3).

4. The method according to claim 1, wherein the container information is a source evolved NodeB (eNB) to target eNB transparent container.

5. The method according to claim 1, wherein the message (#50-2) is a handover request message, and the handover request message is for requesting the target access network device to prepare a handover resource for the terminal device.

6. The method according to claim 1, wherein the message (#50-2) further comprises indication information, and before determining, by the target access network device, the user plane security activation status between the target access network device and the terminal device based on the message (#50-2), the method further comprises:
  determining, by the target access network device based on the indication information, that the terminal device supports on-demand user plane security protection.

7. The method according to claim 6, wherein the indication information is indicated by one or more bits of a security capability of the terminal device, and the security capability of the terminal device indicates at least one security algorithm that can be used by the terminal device.

8. The method according to claim 7, wherein the security capability of the terminal device is a user equipment (UE) evolved packet system security capability.

9. An apparatus, comprising:
  at least one processor coupled to at least one memory storing programming instructions for execution by the at least one processor to cause the apparatus to:
    receive a message (#50-2) from a core network device (#30-1), wherein the message (#50-2) comprises container information generated by a source access network device; and
    determine a user plane security activation status between the apparatus and a terminal device based on the message (#50-2), wherein the user plane security activation status indicates whether user plane ciphering protection is activated and/or whether user plane integrity protection is activated;
  wherein determining the user plane security activation status comprises:
    when the message (#50-2) further comprises a user plane security policy (#40-2) and the container information comprises a user plane security policy (#40-1), determining the user plane security activation status according to the user plane security policy (#40-2).

10. The apparatus according to claim 9, wherein determining the user plane security activation status according to the user plane security policy (#40-2) comprises:
  ignoring the user plane security policy (#40-1); and
  determining the user plane security activation status directly according to the user plane security policy (#40-2).

11. The apparatus according to claim 9, wherein determining the user plane security activation status between the apparatus and the terminal device based on the message (#50-2) further comprises:
  when neither the message (#50-2) nor the container information comprises a user plane security policy, determining the user plane security activation status according to a preconfigured user plane security policy (#40-3).

12. The apparatus according to claim 9, wherein the container information is a source evolved NodeB (eNB) to target eNB transparent container.

13. The apparatus according to claim 9, wherein the message (#50-2) is a handover request message, and the handover request message is for requesting the apparatus to prepare a handover resource for the terminal device.

14. The apparatus according to claim 9, wherein the message (#50-2) further comprises indication information, and the programming instructions are for execution by the at least one processor to cause the apparatus to:

before determining the user plane security activation status, determine, based on the indication information, that the terminal device supports on-demand user plane security protection.

15. The apparatus according to claim 14, wherein the indication information is indicated by one or more bits of a security capability of the terminal device, and the security capability of the terminal device indicates at least one security algorithm that can be used by the terminal device.

16. The apparatus according to claim 15, wherein the security capability of the terminal device is a user equipment (UE) evolved packet system security capability.

17. A non-transitory computer-readable storage medium, comprising instructions for execution by at least one processor of an apparatus to cause the apparatus to:

receive a message (#50-2) from a core network device (#30-1), wherein the message (#50-2) comprises container information generated by a source access network device; and determine a user plane security activation status between the apparatus and a terminal device based on the message (#50-2), wherein the user plane security activation status indicates whether user plane ciphering protection is activated and/or whether user plane integrity protection is activated;

wherein determining the user plane security activation status comprises:

when the message (#50-2) further comprises a user plane security policy (#40-2) and the container information comprises a user plane security policy (#40-1), determining the user plane security activation status according to the user plane security policy (#40-2).

18. The non-transitory computer-readable storage medium according to claim 17, wherein determining the user plane security activation status according to the user plane security policy (#40-2) further comprises:

ignoring the user plane security policy (#40-1); and determining the user plane security activation status directly according to the user plane security policy (#40-2).

19. The non-transitory computer-readable storage medium according to claim 17, wherein determining the user plane security activation status between the apparatus and the terminal device based on the message (#50-2) further comprises:

when neither the message (#50-2) nor the container information comprises a user plane security policy, determining the user plane security activation status according to a preconfigured user plane security policy (#40-3).

20. The non-transitory computer-readable storage medium according to claim 17, wherein the container information is a source evolved NodeB (eNB) to target eNB transparent container.

\* \* \* \* \*